United States Patent Office 3,567,721
Patented Mar. 2, 1971

3,567,721
INDAZOLECARBOXYLIC ACIDS AND
DERIVATIVES THEREOF
Abraham Wajngurt, Riverdale, N.Y., assignor to
Geigy Chemical Corporation, Ardsley, N.Y.
No Drawing. Filed Nov. 29, 1968, Ser. No. 780,170
Int. Cl. C07d 49/18
U.S. Cl. 260—247.2                                   14 Claims

ABSTRACT OF THE DISCLOSURE 1-(o,o'-disubstituted benzoyl)indazole-3-carboxylic acids, esters and amides are anti-inflammatory and analgesic agents. An illustrative embodiment is 1-(2,6-dichlorobenzoyl)-3-carbomethoxy indazole.

---

The present invention pertains to compounds of the formula:

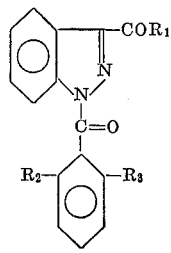

wherein $R_1$ is hydroxy, lower alkoxy, amino, mono(lower)alkylamino, di(lower)alkylamino, di(lower)alkylamino (lower)alkoxy $R_2$ and $R_3$ are lower alkyl or halogen.

The present invention also pertains to (a) the pharmaceutically acceptable acid addition salts of those compounds wherein $R_1$ is di(lower)alkylamino(lower)alkoxy and (b) the pharmaceutically acceptable addition salts with bases of those compounds wherein $R_1$ is hydroxy.

Preferred compounds are those defined in Formula I wherein $R_1$ is hydroxy; those wherein $R_1$ is lower alkoxy; those wherein $R_1$ is amino and $R_2$ and $R_3$ are lower alkyl or halogen; and those wherein $R_1$ is di(lower)alkylamino (lower)alkoxy and $R_2$ and $R_3$ are lower alkyl or halogen.

Furthermore, the present invention relates to novel methods and compositions containing a compound of Formula I or where appropriate a salt thereof for effecting an anti-inflammatory and analgesic response in warm-blooded animals, especially mammals.

The term "lower alkyl" as used herein alone or in combination such as lower alkoxy, mono(lower)alkylamino, di(lower)alkylamino, or di(lower)alkylamino (lower)alkoxy, means a straight or branched hydrocarbon chain of the formula $C_nH_{2n+1}$ wherein $n$ represents an integer of from 1 to 5. Illustrative of such alkyl groups are methyl, ethyl, propyl, isopropyl, butyl, pentyl and the like; illustrative of alkoxy groups are methoxy, ethoxy, propoxy, iso-propoxy, butoxy, iso-butoxy, amyloxy, iso-amyloxy, and the like; illustrative embodiments of di(lower)alkylamino(lower)alkoxy are β-dimethylaminoethoxy, γ-dimethylaminopropoxy, diethylaminoethoxy, dipropylaminoethoxy and the like; illustrative of mono (lower)alkylamino are methylamino, ethylamino, propylamino and the like; illustrative of di(lower)alkylamino are dimethylamino, methylethylamino, diethylamino, and the like.

The term "halo" includes fluorine, chlorine, bromine, and iodine, preferably chlorine.

The term "pharmaceutically-acceptable acid addition salts" when used herein and in the appended claims signifies those salts derived from organic and inorganic acids. Illustrative of such acids are, for example, hydrochloric, hydrobromic, sulfuric, phosphoric, methanesulfonic, acetic, lactic, succinic, malic, aconitic, phthalic, tartaric, pamoic, and the like.

The term "pharmaceutically acceptable addition salts with bases" signifies those salts derived from pharmacologically acceptable inorganic and organic bases. Suitable salts include those of alkali metals such as sodium, potassium or lithium, those of alkaline earth metals such as magnesium and calcium, ammonium and salts of organic amines such as ethylamine, triethylamine, ethanolamine, diethanolamine, diethylaminoethanol, ethylenediamine, benzylamine, procaine, pyrrolidine, piperidine, morpholine, 1-ethyl-piperidine, 2-piperidino ethanol and the like.

The indazolecarboxylic acids described by foregoing Formula I and derivatives thereof can be prepared by acylation of the appropriately substituted ester of indazole-3-carboxylic acid with a substituted benzoyl chloride in the presence of a base, such as sodium hydride in an anhydrous medium, such as toluene, benzene, dimethylsulfoxide and preferably dimethylformamide. This reaction can be represented as follows:

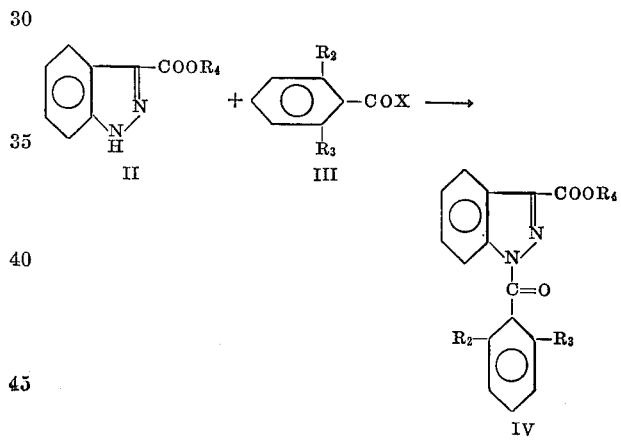

wherein $R_4$ is lower alkyl
X is chlorine or bromine and
$R_2$ and $R_3$ are as defined above.

The corresponding acids can be prepared by mild basic hydrolysis of esters with agents such as aqueous solutions of sodium carbonate, sodium bicarbonate and sodium hydroxide. The acids can also be prepared by treatment of the esters with lithium iodide in a solvent, such as pyridine or collidine, preferred is pyridine. Esters and amides can be prepared from the corresponding acids, by conversion to the corresponding acid halides and treatment with the desired alcohol or amine as follows:

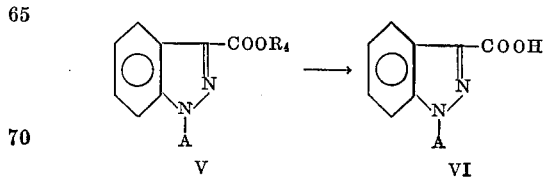

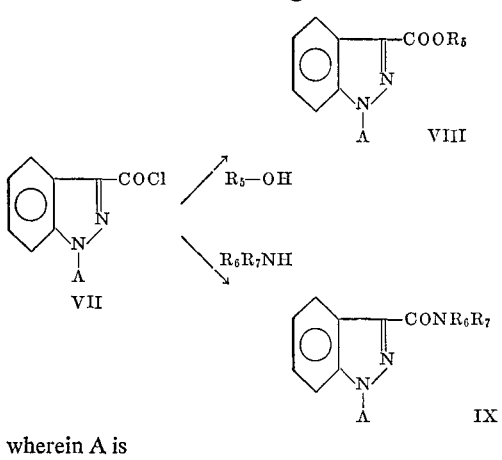

wherein A is $$-CO-\underset{R_2}{\overset{R_3}{\underset{|}{\overset{|}{\bigcirc}}}}$$

and $R_5$ is lower alkyl, di(lower)alkylamino(lower)alkyl
$R_6$ and $R_7$ is H, lower alkyl The starting materials used for the preparation of the indazolecarboxylic acids and their derivatives are known.

The compounds of the present invention demonstrate the properties of inhibiting and reducing inflammation, and of relieving pain in warm-blooded animals when administered orally or parenterally. They are thus useful as anti-inflammatory and analgesic agents. The anti-inflammatory property of this class of compounds can be conveniently observed in the laboratory model in such art recognized tests as the turbidity model, and the adjuvant arthritis screens. The analgesic activity can be observed in the acetic acid stretch test.

In the turbidity model test, inhibition of heat coagulation of serum proteins was observed in rats at a dose of 100 mg./kg. p.o. In the adjuvant arthritis screen, the tested compounds showed protection at daily doses of 25 mg./kg. p.o. and 100 mg./kg. p.o.

In the acetic acid stretch test, a decrease in number of stretches is observed in mice at a dose of 100 mg./kg. p.o.

According to this invention, the compounds of Formula I are administered to mammals for the purpose of treating various inflammatory conditions, i.e. diseases or other conditions of mammals which are commonly treated with known anti-inflammatory agents, such as arthritis, rheumatism, and related diseases of an inflammatory nature. They are particularly suited for inflammatory conditions accompanied by pain. The compounds of Formula I are also suitable for the relief of pain.

The following description of using and making the invention represents the best modes presently contemplated for carrying out the invention. For use as anti-inflammatory and analgesic agents, the compounds of the present inention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent carrier or vehicle.

Powders are prepared by comminuting a compound of this invention to a suitably fine size and mixing with a similarly comminuted diluent. The diluent can be an edible carbohydrate material such as starch. A sweetening agent of sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like is wetted with a binder such as acacia mucilage, gelatin solution, methyl-cellulose solution and forced through a screen to form granules which are allowed to dry. A suspending agent such as tragacanth may be included in the composition.

Capsules are made by preparing a powder mixture as described above and filling formed gelatin sheaths. As an adjuant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into slugs. The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration. Particularly suitable for parenteral administration are the addition salts of the compounds of Formula I.

The amount of these compounds which is administered in use to effect an anti-inflammatory and analgesic response must in all cases be adjusted to the animal being treated, its age, weight, and condition as well as the degree of response required. Thus while anti-inflammatory and analgesic response is observed for these compounds in the range of about 10 mg./kg. to about 100 mg./kg. p.o., the actual dose should be carefully titrated to the particular subject in accordance with well recognized principles of pharmacology.

The following examples are given by way of illustrating the process for the preparation of the compounds and the compositions without limiting the scope thereof in any way. The temperatures are given in degrees centigrade.

EXAMPLE 1

1-(2,6-dichlorobenzoyl)-3-carbomethoxy-indazole 11.6 g. (0.06 mole) of 6,2-dichlorobenzoic acid was suspended in 200 ml. of dry benzene. To this suspension was added 14 g. of thionyl chloride. The mixture was refluxed for 5 hours and then concentrated to a syrupy residue in vacuo The residue was taken up in 100 ml. of benzene and again concentrated to a syrup. A solution of 10.6 g. (0.06 mole) of 3-carbomethoxy-indazole in 50 ml. of dry dimethylformamide was added dropwise over a period of 30 minutes to a cold suspension of 3.0 g. of sodium hydride (as a 55% emulsion in mineral oil) in 50 ml. of dimethylformamide. The mixture was stirred at room temperature for 1 hour and cooled to 5° and the acid chloride of 2,6-dichlorobenzoic acid in 100 ml. of dimethylformamide was added dropwise. The suspension was stirred overnight at room temperature. The reaction mixture was warmed with stirring for a period of 30 minutes at 60°.

The mixture was cooled and added to 1500 g. of ice-water and then made basic with 3 N sodium hydroxide. After standing for 4 hours the crystalline compound was filtered, washed well with water and recrystallized from ethanol; M.P. 176–178°.

*Analysis.*—Calc'd for $C_{16}H_{10}Cl_2N_2O_3$ (percent): C, 55.03; H, 2.89; N, 8.02. Found (percent): C, 54.96; H, 3.04; N, 8.01

EXAMPLE 2

1-(2,6-dichlorobenzoyl)-3-carboxyindazole 10.5 g. (0.03 mole) of 1-(2,6-dichlorobenzoyl)-3-carbomethoxyindazole was suspended in 30 ml. of dry pyridine. To this mixture was added 9.06 g. (0.06 mole) of lithium iodide. The mixture was stirred at 100° for a period of 15 hours and then concentrated in vacuo. The residue was dissolved in 200 ml. of water and extracted three times with 100 ml. of ether. The aqueous layer was made acidic with 3 N hydrochloric acid. The compound precipitated. The crystalline compound was filtered, washed well with water and recrystallized from ethanol; M.P. 249–250°.

*Analysis.*—Calc'd for $C_{15}H_8Cl_2N_2O_3$ (percent): C, 53.75; H, 2.44; N, 8.35. Found (percent): C, 53.57; H, 2.48; N, 8.35.

EXAMPLE 3

1-(2,6-dichlorobenzoyl)-3-indazole-carboxamide 6.70 g. (0.02 mole) of 1 - (2,6 - dichlorobenzoyl)-3-carboxyindazole were suspended in 40 ml. of thionyl chloride and the mixture was refluxed for 2 hours. The excess thionyl chloride was removed by distillation under reduced pressure. The remaining syrup was dissolved in 50 ml. of benzene, cooled to 5° and saturated with ammonia gas. The precipitate was filtered and washed well with water. After recrystallization from ethanol the title compound melted 237–239°.

*Analysis.*—Calc'd for $C_{15}H_9Cl_2N_3O_2$ (percent): C, 53.91; H, 2.72; N, 12.58. Found (percent): C, 54.17; H, 2.58; N, 12.69.

EXAMPLE 4

β-Dimethylaminoethyl-1-(2,6-dichlorobenzoyl)-3-indazolecarboxylate hydrochloride 6.70 g. (0.02 mole) of 1-(2,6-dichlorobenzoyl)-3-carboxyindazole was suspended in 40 ml. of thionyl chloride and the mixture was refluxed for 2 hours. The excess thionyl chloride was removed by distillation under reduced pressure. The residue was taken up in 50 ml. of benzene and again concentrated to a syrup. The residue was then dissolved in 80 ml. of benzene and cooled to 10° C. To this mixture was added dropwise a solution of 2 g. of 2-dimethylaminoethanol in 25 ml. of benzene. The addition took 30 minutes. The reaction mixture was refluxed for 1 hour, cooled and filtered. After recrystallization from ethanol, the title compound melted at 222–223°.

*Analysis.*—Calc'd for $C_{19}H_{17}Cl_2N_3O_3 \cdot HCl$ (percent): C, 51.54; H, 4.10; N, 9.49. Found (percent): C, 51.51; H, 4.01; N, 9.46.

EXAMPLE 5

1-(2,6-dimethylbenzoyl)-3-carbomethoxyindazole 10.6 g. (0.06 mole) of 3-carbomethoxy-indazole in 50 ml. of dimethylformamide was added dropwise to a cold suspension of 3.2 g. of sodium hydride (as a 50% emulsion in mineral oil) in 50 ml. of dimethylformamide. The mixture was stirred at room temperature for one hour and cooled to 5° and 10.2 g. (0.06 mole) of 2,6-dimethylbenzoyl chloride prepared according to the procedure described by Hering, Helv. Chim. Acta, 43, 104, (1960), in 25 ml. of dimethylformamide was added dropwise. The suspension was stirred overnight at room temperature. The reaction mixture was then warmed with stirring for a period of 30 minutes at 60°. The mixture was cooled and added to 1 liter of ice-water and then made basic with 3 N sodium hydroxide. The crystalline compound was filtered, washed well with water and recrystallized from ethanol; M.P. 118–120°.

*Analysis.*—Calc'd for $C_{18}H_{16}N_2O_3$ (percent): C, 70.08; H, 5.23; N, 9.09. Found (percent): C, 69.79; H, 5.56; N, 9.01.

EXAMPLE 6

β-Dimethylaminoethyl 1-(2,6-dimethylbenzoyl)-indazole-3-carboxylate hydrochloride 7.5 g. (0.025 mole) of 1-(2,6-dimethylbenzoyl)-3-carboxyindazole were suspended in 50 ml. of thionyl chloride and the mixture was refluxed for two hours. The excess thionyl chloride was removed by distillation under reduced pressure. The residue was dissolved in 50 ml. of dry benzene and again concentrated to a syrup. The residue was then dissolved in 100 ml. of benzene and cooled to 10° C. To this solution was added, dropwise, a solution of 2.5 g. (0.025 mole) of 2-dimethylaminoethanol in 30 ml. of dry benzene. The addition took 20 minutes. The reaction mixture was refluxed for three hours, cooled and filtered. After recrystallization from ethanol, the title compound melted at 234–235°.

*Analysis.*—Calc'd for $C_{21}H_{23}N_3O_3 \cdot HCl$ (percent): C, 62.76; H, 6.02; N, 10.46. Found (percent): C, 62.81; H, 6.13; N, 10.42.

EXAMPLE 7

1-(2,6-dimethylbenzoyl)-3-carboxy-indazole 9.2 g. (0.03 mole) of 1-(2,6-dimethylbenzoyl)-3-carbomethoxyindazole was suspended in 30 ml. of dry pyridine. To this mixture was added 9.06 g. (0.06 mole) of lithium iodide. The mixture was stirred at 100° for a period of 15 hours and then concentrated in vacuo. The residue was dissolved in 200 ml. of water and extracted three times with 100 ml. of ether. The aqueous layer was made acidic with 3 N hydrochloric acid. The compound precipitated. The crystalline compound was filtered, washed well with water and recrystallized from a mixture of isopropanol and water 1:1. The product melted at 208–209°.

*Analysis.*—Calc'd for $C_{17}H_{14}N_2O_3$ (percent): C, 69.38; H, 4.79; N, 9.52. Found (percent): C, 69.17; H, 4.91; N, 9.54.

EXAMPLE 8

| Ingredient: | Quantity/capsule, mg. |
|---|---|
| 1 - (2,6 - dichlorobenzoyl) - 3 - carbomethoxy indazole | 100 |
| Corn starch, U.S.P. | 200 |

The foregoing ingredients are mixed and introduced into a two-piece No. 1 hard gelatin capsule.

EXAMPLE 9

| Ingredient: | Quantity/capsule, mg. |
|---|---|
| 1 - (2,6-dichlorobenzoyl)-3-carboxyindazole | 50 |
| Corn starch U.S.P. | 130 |
| Lactose | 160 |
| Cab-O-Sil M-5 | 4 |
| Gelatin U.S.P. | 5 |
| Magnesium stearate U.S.P. | 1 |

The foregoing ingredients are thoroughly mixed and pressed into tablets suitable for oral administration of 50 g. of active ingredient. The tablets may be scored to permit administration of fractional doses.

EXAMPLE 10

| Ingredient: | Quantity/tablet, mg. |
|---|---|
| 1 - (2,6-dimethylbenzoyl)-3-carboxyindazole | 100 |
| Lactose | 80 |
| Corn starch | 70 |
| Soluble starch | 15 |
| Magnesium stearate | 5 |

The first three ingredients are thoroughly mixed and granulated with a solution of the soluble starch. This granulate is dried, mixed with the magnesium stearate and pressed into tablet cores which are coated as with sugar.

What is claimed is:

1. A compound of the formula

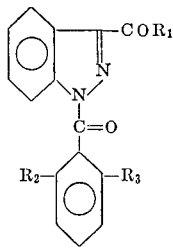

wherein $R_1$ is hydroxy, lower alkoxy, amino, mono(lower)alkylamino, di(lower)alkylamino, di(lower)alkylamino(lower)alkoxy, $R_2$ and $R_3$ are lower alkyl or halogen.

2. A compound as defined in claim 1 wherein $R_1$ is hydroxy and $R_2$ and $R_3$ are lower alkyl or halo.

3. A pharmaceutically acceptable base addition salt of a compound as defined in claim 2.

4. A compound as defined in claim 1 wherein $R_1$ is lower alkoxy and $R_2$ and $R_3$ are lower alkyl or halo.

5. A compound as defined in claim 1 wherein $R_1$ is amino and $R_2$ and $R_3$ are lower alkyl or halo.

6. A compound as defined in claim 1 wherein $R_1$ is di(lower)alkylamino(lower)alkoxy and $R_2$ and $R_3$ are lower alkyl or halo.

7. A pharmaceutically acceptable acid addition salt of a compound as defined in claim 6.

8. A compound as defined in claim 1 wherein $R_1$ is methoxy and $R_2$ and $R_3$ are chloro.

9. A compound as defined in claim 1 wherein $R_1$ is hydroxy and $R_2$ and $R_3$ are chloro.

10. A compound as defined in claim 1 wherein $R_1$ is amino and $R_2$ and $R_3$ are chloro.

11. A compound as defined in claim 1 wherein $R_1$ is $\beta$-dimethylaminoethoxy and $R_2$ and $R_3$ are chloro.

12. A compound as defined in claim 1 wherein $R_1$ is methoxy and $R_2$ and $R_3$ are methyl.

13. A compound as defined in claim 1 wherein $R_1$ is $\beta$-dimethylaminoethoxy and $R_2$ and $R_3$ are methyl.

14. A compound as defined in claim 1 wherein $R_1$ is hydroxy and $R_2$ and $R_3$ are methyl.

References Cited

UNITED STATES PATENTS

| 3,007,938 | 11/1961 | Kirchner | 260—310B |
| 3,145,215 | 8/1964 | Kirchner | 260—310B |
| 3,457,269 | 7/1969 | Kirchner | 260—310B |

OTHER REFERENCES

Auwers et al.: Chem. Abst., vol. 16, pp. 3656–9 (1922), QD1.A51.

Auwers et al.: Chem. Abst., vol. 16, pp. 930–33 (1922), QD1.A51.

Auwers et al.: Berichte, vol. 59, pp. 529–38 (1926), QD1.D4.

Gladstone et al.: J. Chem. Soc., C, Org. (London), 1966, pp. 1527–31, QD1.C6.

NATALIE TROUSOF, Primary Examiner

U.S. Cl. X.R.

260—294, 310, 311; 424—248, 267, 273